O. Clarke,
Cider Mill.
Nº 43,095. Patented June 14, 1864.
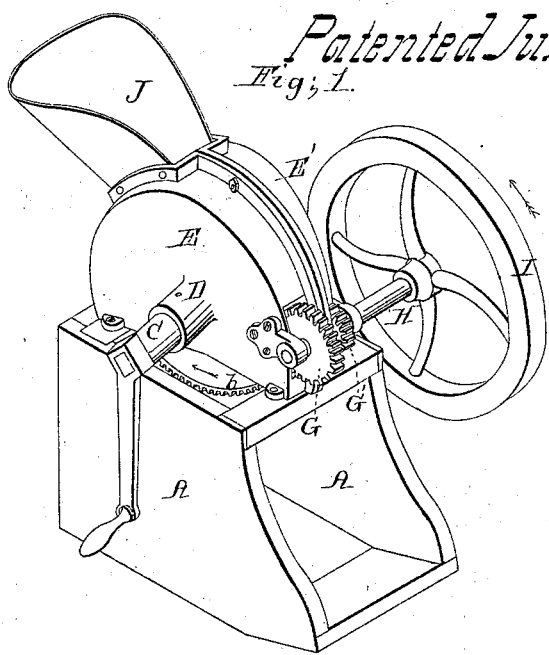
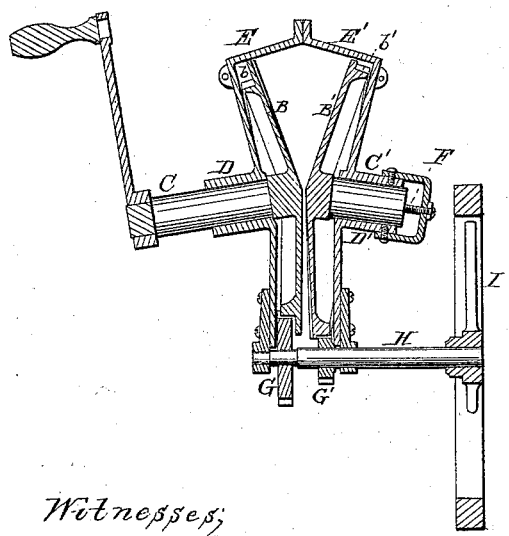
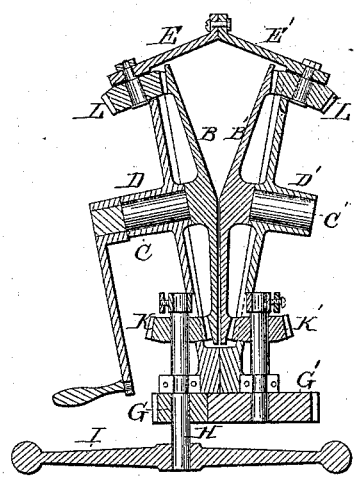
Witnesses:
J. Snowden Bell
John Meigs.
Inventor:
Orlando Clarke
by his attys
Baldwin & Son

UNITED STATES PATENT OFFICE.

ORLANDO CLARKE, OF ROCKFORD, ILLINOIS.

IMPROVEMENT IN CIDER-MILLS.

Specification forming part of Letters Patent No. 43,095, dated June 14, 1864.

*To all whom it may concern:*

Be it known that I, ORLANDO CLARKE, of Rockford, in the county of Winnebago and State of Illinois, have invented a certain new and useful Improvement in Cider-Mills, of which the following is a full, clear, and exact description, reference being had to the accompanying drawings, which make part of this specification, and in which—

Figure 1 represents a view in perspective of an apple-grinding machine embracing my improvement; Fig. 2, a horizontal section through the same in the plane of the driving-shaft and Fig. 3 a similar view of a modified form of the same.

In cider-mills as heretofore constructed, the apples are liable either to be cut into small pieces without compression, which prevents the escape of the juice, or else to be crushed into so fine a pulp as to cause it to pack when pressed, and thus require more power to express the juice than many of the machines, particularly those of the smaller class, (known as "hand-machines,") are capable of exerting, whereby great loss of juice is occasioned.

It is the object of my invention to reduce apples and other fruit to a pulp of uniform consistency, the degree of fineness of which is completely under the control of the attendant in order to suit the varying conditions under which the machine is required to operate; and to this end my improvement consists, first, in the employment of two grinding or cutting disks (one or both of which have convex conical grinding-surfaces) so combined that one shall rotate faster than the other in order to give the fruit a rotating movement, substantially as hereinafter shown; secondly, in so combining the two grinding-disks that while mounted on oblique shafts independent of each other they shall be driven by gearing from the same counter-shaft, thereby insuring the proper relation of the movements of the two disks; thirdly, in mounting the entire mechanism in a metallic shell or casing for the purpose of preventing warping or twisting of the parts, as hereinafter described.

In the accompanying drawings, which represent a convenient arrangement of parts for carrying out the objects of my invention, the mechanism is shown as mounted upon a stout frame, A, which likewise, in this instance, forms a receptacle for the pomace. The grinding-disks B B' are mounted on independent short shafts or axles C C', which are oblique to each other, although in the same horizontal plane. These shafts turn in journals or boxes D D', respectively, cast or otherwise secured to the flanged shells E E', which inclose the gearing. The disks B B' are made in the form of a very flat cone, and so arranged that one half of their faces lie nearly parallel to each other, while the other half diverges, as shown in Fig. 2 of the drawings. The distance between the disks may be regulated by causing the disk B' to slide endwise in its bearings, its traverser being regulated by a set-screw, F. Each of the disks has spur-gearing $b$ $b'$ on its periphery, that of the disk B driving a spur-wheel, G, on a counter-shaft, H, which carries a smaller spur-pinion, G', which meshes into the gearing of the disk B. As one of these pinions has a less number of teeth than the other, it follows that one of the grinding-disks will rotate faster than the other. A balance-wheel, I, is mounted upon the counter-shaft, and may serve as a driving-pulley where power is used.

The operation of the machine is as follows: The parts rotate in the direction indicated by the arrows. The apples are fed into the hopper J, the bottom of which projects between the disks in the form of a tongue to prevent them from falling into the under part of the opening. This tongue is not shown in the drawing, being above the plane of section. The apples are caught between the disks and gradually passed into the narrow space between them and rapidly crushed, the operation being much assisted by the rolling motion imparted to the apples by the differential velocity of the disks. The pomace falls into the receptacle below in a pulp of uniform consistency, the fineness of which is regulated by adjusting the grinding-disks nearer to or farther from each other.

Fig. 3 shows a modified form of the machine. In this instance the gearing is on the outer faces of the disks, the pinions K K' and L L' serving as tightening-rollers, and relieving to some extent the journals of the disks from the strain to which they are unavoidably subjected in the other form of machine.

The same letters indicate corresponding parts in all the figures.

The disks can readily be adjusted, as the bearings of the pinions are mounted in slots in the casing, and are regulated by set-screws.

The grinding-surfaces of the disks may be plain, rough, or corrugated, as preferred. I prefer them, however, corrugated radially from their centers.

It is obvious that one of the grinding-disks might have a plane surface and still produce very good results.

What I claim as my invention, and desire to secure by Letters Patent, is—

1. The combination of two grinding-disks, (one or both of which have a convex conical grinding-surface,) when one of said disks rotates faster than the other to impart a rolling motion to the fruit, as herein described.

2. The combination of the convex conical grinding-disks and the oblique independent shafts with the driving-pinions of different sizes on the counter-shaft, substantially as described, for the purpose set forth.

3. The combination of the grinding-disks and gearing with the shells E E', when arranged and operating as and for the purpose described.

4. The combination of the disks, the gearing, the shells, and the hopper with the main frame, substantially in the manner described.

In testimony whereof I have hereunto subscribed my name.

ORLANDO CLARKE.

Witnesses:
S. A. GRANGER,
C. M. UTTER.